Patented Jan. 4, 1938

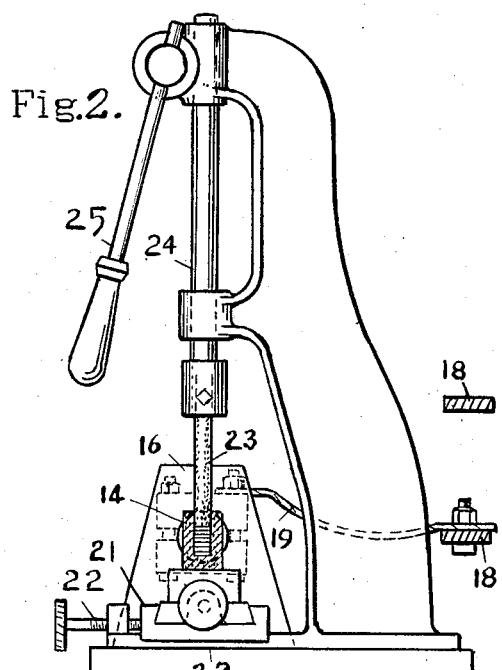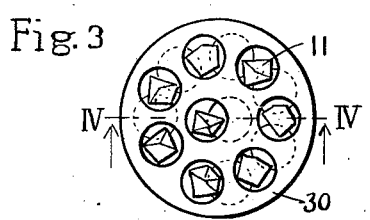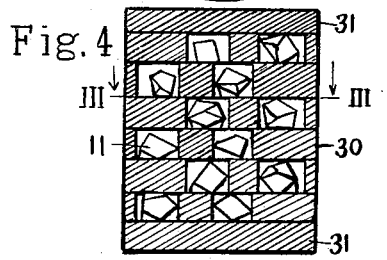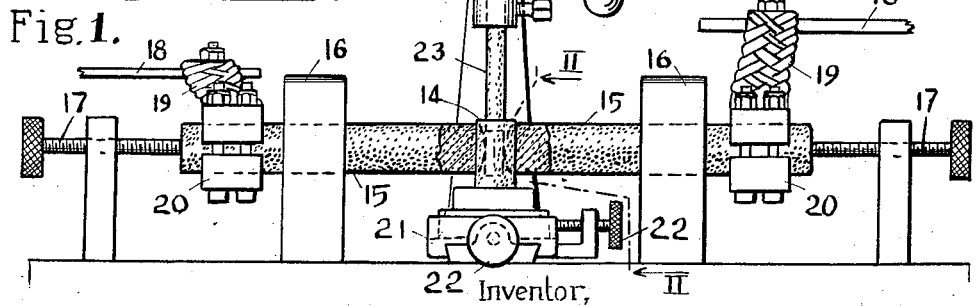

2,104,703

UNITED STATES PATENT OFFICE 2,104,703

METHOD OF FORMING DIAMOND TOOLS

Rutherford H. Taylor, Millburn, N. J., assignor to J. K. Smit & Sons, Inc., New York, N. Y., a corporation of New York Application December 14, 1936, Serial No. 115,735

1 Claim. (Cl. 76—101)

The object of this invention is to provide a diamond tool in which small diamonds are effectively utilized by reason of substantially uniform distribution and suitable placement throughout the setting whereby always approximately the same number will be exposed at the cutting face and in service throughout the life of the tool. A further object is to insure to each diamond its individual setting out of contact with any other diamond so that the wearing away or loosening of any diamond will not thereby loosen any other diamond. A further object is to so place each diamond in the setting that the exposed part will be in an advantageous position for cutting service.

In the accompanying sheet of drawings which forms a part of this description,

Figure 1 is a front elevation of a tool for electrically heating and softening a diamond setting and compressing it around the diamonds. Fig. 2 is a side elevation and section of the tool on the line II—II of Fig. 1. Fig. 3 is a top view of a composite setting on the line III—III of Fig. 4, with several of the disks removed. Fig. 4 is a section through the axis of the same on the line IV—IV of Fig. 3.

The setting is composite, in other words it is made of several pieces so that small diamonds may be inserted separated from one another and in substantially uniform distribution throughout the setting. Disks 30 of a hard alloy, as for example a nickel-copper alloy or a copper-silicon-manganese alloy which will become soft when heated before melting and becoming fluid, have holes drilled through them, the disks being of a thickness and the holes being of a diameter which will make the cells just sufficient to hold diamonds of the size that it is intended to use. These are stacked in a carbon crucible 14. Each disk after it has been put into the crucible has its holes filled with diamonds, and the disks are placed on one another so that the holes will not be opposite and the diamonds in any disk will not contact with those in the disk beneath. The middle holes in the disks are located eccentric to the centers of the disks so that the disks can be stacked in such manner that these holes will not coincide. A blank disk 31 is at each end of the stack.

The crucible is clamped between electrodes 15. The electrodes are supported and guided in cement bearings 16 and pressed against the sides of the crucible by screws 17. Current is brought to the electrodes from bus bars 18 which are connected through copper braids 20 on the electrodes. The crucible is supported on a compound slide 21 adjustable by screws 22 by which it is centered under a carbon ram 23 which is brought down against the top of the setting by means of a sliding rod 24 which is operated by a lever 25.

After the setting has been heated and rendered plastic and compressed around the diamonds and has cooled it is taken from the crucible and the metal is cut away at one end, preferably the bottom end, and in any suitable manner as by sand blasting to partially expose the bottom layer of diamonds as the diamonds when uncovered from this end are mostly found to lie in a better position for use.

I claim,—

The method of forming a diamond tool which consists in providing a series of disks of hard alloy which will become soft when heated, the disks having holes therethrough, stacking the disks so that the holes will not be opposite and will form cells each cell containing a single diamond, applying heat to soften the alloy, applying pressure to compact the alloy around the diamonds, and subsequently cutting away one end of the setting to expose the end diamonds.

RUTHERFORD H. TAYLOR.